April 4, 1961     S. DE KANTER     2,977,773
HEAT PUMP INCLUDING CHARGE MODULATING MEANS
Filed Feb. 12, 1960
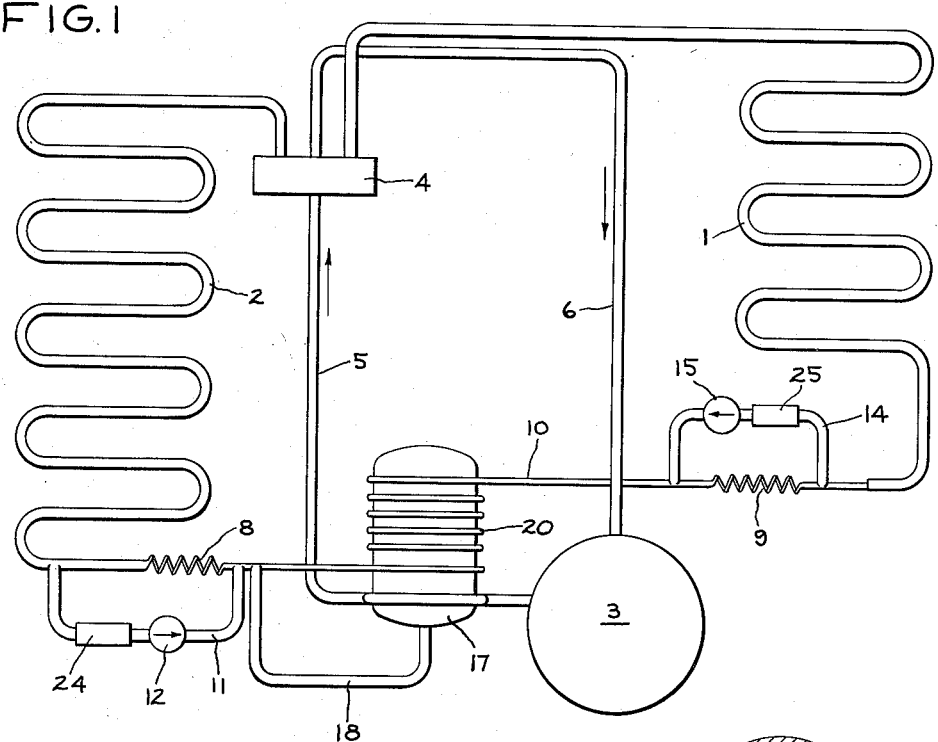
FIG.1
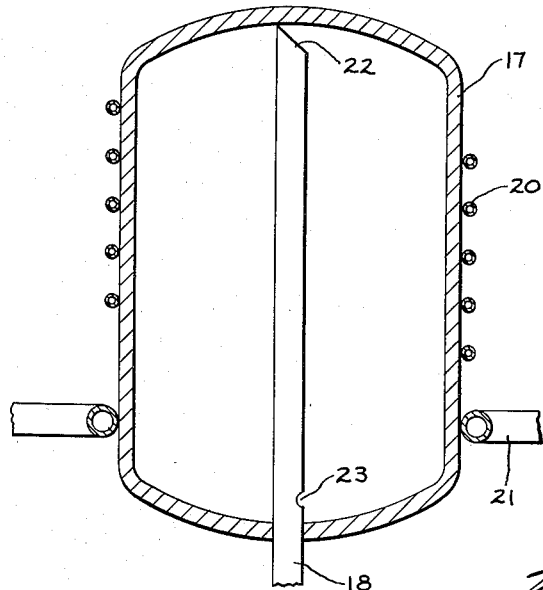
FIG.2
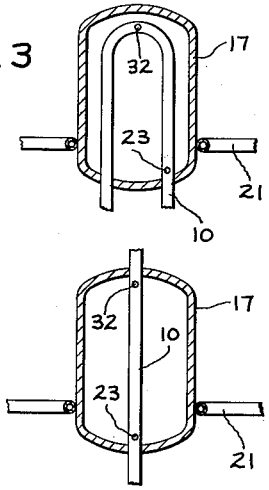
FIG.3
FIG.4
INVENTOR
SCIPIO deKANTER
BY *Walter E. Kule*
HIS ATTORNEY

United States Patent Office 2,977,773
Patented Apr. 4, 1961

2,977,773

HEAT PUMP INCLUDING CHARGE MODULATING MEANS

Scipio de Kanter, Tyler, Tex., assignor to General Electric Company, a corporation of New York Filed Feb. 12, 1960, Ser. No. 8,340

5 Claims. (Cl. 62—149)

The present invention relates to heat pumps and is more particularly concerned with a heat pump comprising a fixed flow control means for controlling the flow of refrigerant through a reversible refrigerant circuit and charge modulating means for regulating the effective circulating charge of refrigerant in order to maintain efficient operation of the system under various operating conditions.

A heat pump employed for cooling the enclosure in the summer and heating the enclosure during the colder months of the year essentially comprises a reversible refrigerant circuit including an indoor heat exchanger, an outdoor heat exchanger, means including a compressor and reversing valve mechanism for effecting the flow of refrigerant through the circuit in either direction and means for controlling the flow of refrigerant from one heat exchanger to the other and for maintaining a pressure differential between the two heat exchangers.

A tubular flow restrictor, generally known as a capillary tube even though it may have a relatively large cross section when used in larger size refrigerating systems, provides a simple and low cost means for controlling the refrigerant flow and maintaining a pressure difference between the heat exchangers. However, since a capillary tube provides a substantially fixed flow restriction, it has only one ideal operating condition so that a circuit including a capillary tube flow restrictor will operate with maximum efficiency within a relatively narrow range of temperatures and pressures determined by the system design and refrigerant charge. In other words, a capillary tube cannot effectively vary the refrigerant flow to compensate for the changing temperature and pressure conditions under which the circuit may be required to operate. This problem is particularly troublesome in the application of a capillary tube flow restriction to year-around heat pumps where the relatively extreme ambient temperature conditions to which the system is subjected call for a substantial regulation of refrigerant flow in order to maintain maximum efficiency of operation at all times.

The present invention has as its general object the provision of an improved heat pump including a capillary tube flow restricting means and charge modulating or regulating means designed to control the effective circulating refrigerant charge in the refrigerant circuit and maintain the desired operational efficiency of the heat pump under varying operating conditions.

Another object of the invention is to provide a heat pump including a reversible refrigerant circuit comprising fixed tubular flow restricting means and means responsive to temperature conditions in two different parts of the system for maintaining the desired refrigerant charge circulating in the system.

Further objects of the invention will become apparent as the following description proceeds and the features of novelty which characterize the invention will be pointed out with particularity in the claims annexed to and forming part of this specification.

In carrying out the objects of the present invention there is provided a heat pump comprising an indoor heat exchanger and an outdoor heat exchanger connected in a closed refrigerant circuit, the circuit also including means comprising a compressor having a discharge line and suction line and a reversible valve arrangement for reversibly connecting the discharge and suction lines of the compressor to the heat exchangers for effecting flow of refrigerant through the circuit in either direction. To maintain a pressure difference between the heat exchangers during operation of the heat pump on either of the heating or cooling cycle, there is employed a fixed flow restricting means comprising a heating capillary connected to the outdoor heat exchanger and a cooling capillary connected to the indoor heat exchanger. The two capillaries are connected in series by a conduit and are each provided with a bypass means whereby the heating capillary is bypassed during operation of the heat pump on the cooling cycle so that the cooling capillary provides the desired flow restriction while on the heating cycle the cooling capillary is similarly bypassed. By this arrangement of the two capillary flow restrictors and the capillary bypassing means, this conduit on both the heating and cooling cycles contains high pressure liquid refrigerant flowing from that heat exchanger functioning as a condenser. In order to control and regulate the effective refrigerant charge circulating in the circuit for the purpose of obtaining maximum possible operating efficiency over a wide range of operating conditions, there is provided a charge modulating means in the form of a dead-end refrigerant receptacle which is connected to the conduit between the two capillaries by a two-way flow connection and is placed in heat exchange relation with a section of that conduit and also with a section of the compressor discharge line so that it is subjected both to the temperature of the condensed refrigerant leaving the condenser and the hot compressed refrigerant discharged from the compressor. The heat exchange between the conduit and the receptacle is such that when there is a greater sub-cooling of the condensed refrigerant than desired, the sub-cooled refrigerant will cool the charge modulating receptacle to a point where it will withdraw charge from the system thereby reducing the total effective charge circulating in the system and hence the amount of sub-cooling taking place in the condenser. Conversely, if the sub-cooling should not be sufficient, the resultant warming of the receptacle will cause some of the stored refrigerant to enter the system. As a result of the heat exchange with the discharge line connecting the compressor with the reversing valve, advantage is taken of the fact that the temperature of the compressor discharge gas reflects flooding or starving of the evaporator coil. Excessive starving conditions result in higher discharge line temperatures which in turn warm the receptacle sufficiently to introduce additional refrigerant into the circuit.

For a better understanding of the invention, reference may be had to the accompanying drawing in which:

Fig. 1 represents diagrammatically a heat pump embodying the present invention;

Fig. 2 is an enlarged sectional view of a preferred form of charge modulating receptacle forming part of the system of Fig. 1; and Figs. 3 and 4 illustrate modified forms of the receptacle and the manner in which it is connected into the system.

Referring now to the drawing the heat pump illustrated in Fig. 1 comprises an indoor heat exchanger 1 and an outdoor heat exchanger 2 which ordinarily is somewhat larger, that is, has a greater radiating surface than the indoor heat exchanger 1. Means for withdrawing refrigerant from one of the two heat exchangers and discharging refrigerant into the other includes a motor-driven compressor 3 and a reversing valve means 4. The reversing means reversibly connects the discharge line 5 and the suction line 6 of the compressor to the remaining portions of the circuit so that the compressor will withdraw refrigerant from either the indoor or the outdoor heat exchanger and discharge refrigerant into the other of the two heat exchangers.

In order to control the flow of refrigerant from one heat exchanger to the other and to provide the desired pressure differential between the two heat exchangers, there is provided a fixed flow restricting means comprising a heating cycle capillary 8 connected to the outdoor heat exchanger 2 and a cooling cycle capillary 9 connected to the indoor heat exchanger 1, the two capillaries being connected by a conduit 10. Each of the capillaries also has associated therewith a bypass line for bypassing that capillary during operation of the system on one of the cycles. More specifically, the heating capillary 8 is provided with a bypass line 11 including a check valve 12 which permit the flow of condensed refrigerant through the bypass line and into the conduit 10 during operation of the system on the cooling cycle while the cooling capillary 9 is provided with a bypass line 14 including a check valve 15 for permitting flow of condensed refrigerant through the bypass line during operation of the system on the heating cycle. By this arrangement of the capillaries and bypass lines, it will be seen that the conduit 10 connecting the two capillaries is always part of the high pressure side of the system regardless of whether the system is operating on the cooling or heating cycle and is therefore conveying condensed refrigerant at the pressure of the heat exchanger functioning as the condenser. When refrigerant driers are employed, they may be included in either or both of the bypass lines as indicated in Fig. 1 of the drawing by the numerals 24 and 25.

As has been previously indicated, for any heat pump system including a fixed or capillary tube flow restricting means, there is an optimum charge for most efficient operation of the system under any particular range of operating conditions. In other words, for a given charge, a capillary tube circuit can be expected to operate with maximum efficiency only within a narrow range of temperatures and pressures. Since a heat pump must operate under a wide variety of temperature and pressure conditions due not only to the marked change in these conditions in switching over from cooling to heating operation or vice versa but also due to the wide range of outdoor temperatures in which the outdoor coil is subjected during operation on the two cycles, there is provided in accordance with the present invention means for controlling the effective refrigerant charge in order to compensate for these changing operating conditions. Specifically, there is provided a dead-end storage receptacle 17 which is connected by means of a two-way flow line 18 to the conduit 10 and is therefore always subjected to a system pressure corresponding to the high pressure or condenser side of the system. For the purpose of effecting automatic withdrawal of refrigerant gas from this system or discharge of refrigerant from the receptacle 17 into the system to regulate the system charge, the receptacle is heat exchanged with both the conduit 10 and the compressor discharge line 5. For this purpose a plurality of loops 20 of the conduit 10 may be wrapped around the upper portion of the receptacle 17 while a single loop 21 of the discharge line is wrapped partially around the lower portion of the receptacle.

By this arrangement the amount of warming or cooling of the receptacle 17 by the combined action of the heat exchange loops 20 and 21 or more specifically by the refrigerant circulating in these loops causes refrigerant to be withdrawn from or added to the circuit depending upon the temperatures of the refrigerant in the conduit 10 and the discharge line 5 thereby controlling the effective charge of refrigerant circulating in the heat pump circuit. As the conduit 10 positioned between the two capillaries carries high pressure liquid regardless of the cycle of operation of the heat pump and as the discharge line 5 including its heat exchange loop 21 functions as a compressor discharge line on both cycles of operation, the charge modulator is effective and operated in the same manner on both cycles.

The advantages of the receptacle 17 when thus connected into the high pressure or condenser side of the circuit and heat exchanged with the conduit 10 and the discharge line 5 will become more apparent from a consideration of the operation of the system on either the heating or the cooling cycle. On either cycle, the condensed refrigerant leaving the heat exchanger operating as a condenser and flowing through the conduit 10 is in a liquid slightly sub-cooled state. Since the receptacle is connected to the conduit 10, it operates at substantially the same pressure so that if any excessive sub-cooling of the refrigerant takes place in the condenser due to, for example, low ambient condenser temperatures, a drop of a few degrees in the temperature of the liquid refrigerant flowing through loops 20 will cool the receptacle and cause refrigerant vapor to condense in the receptacle. Liquid refrigerant is thereupon withdrawn from the circuit into the receptacle. This withdrawal, which decreases the amount of refrigerant circulating in the system continues until the pressures in the system drops to a point where only the desired sub-cooling is obtained. If, on the other hand, the temperature of conduit 10 increases due to insufficient sub-cooling, the increased temperature of the loops 20 will reduce the temperature difference between loops 20 and 21 which will warm the liquid in receptacle 17 thereby causing some of the liquid stored therein to vaporize and force some of the liquid out of the receptacle and back into the refrigerating circuit. Thus by the heat exchange with conduit 10, liquid refrigerant is either removed from the circuit or added to the circuit to maintain the desired degree of sub-cooling at the condenser outlet.

The heat exchange between loop 21 of the discharge line 5 and the receptacle 17 take advantage of the fact that the temperature of discharge gas from the compressor is related to the operation of the evaporator coil, this temperature decreasing under conditions which cause flooding or superheating of the evaporator and increasing under operating conditions which cause the evaporator to be starved or short of the refrigerant. By providing a heat exchange between receptacle 17 and the discharge line 5, the discharge gas temperatures are employed to cause liquid refrigerant to be withdrawn from the system or discharged into the system. Since line 5 operates at a higher temperature than conduit 10, only a limited heat exchange between the receptacle 17 and line 5 is required or desirable as otherwise the heating effect of line 5 would be so great as to override the effect of loops 20 regardless of how much sub-cooling is taking place in the condenser. However, with a balanced heat exchange between receptacle 17 and the loops 20 and 21, the loop 20 effectively maintains the desired evaporator conditions. If the temperature of the discharge gas from the compressor increases as a result of superheating, i.e. starving in the heat exchanger functioning as the evaporator, liquid refrigerant stored in the receptacle 17 will be discharged into the circuit thereby increasing the charge and correcting the superheating condition. On the other hand, flooding of the heat exchanger functioning as an evaporator will produce a lower discharge line temperature and permit refrigerant to be removed from the circuit to correct the flooding condition.

Thus, the receptacle 17 controls the circulating refrigerant charge and hence the system operation in response to two system conditions which vary depending upon the load on the heat pump. Furthermore, the charge modulating action is effective on either operating cycle not only because the conduit 10 and discharge line 5 perform the same functions in each cycle of operation but also because the dual regulatory action is effective regardless of which heat exchanger is functioning as the condenser or evaporator.

Preferably, in the receptacle shown in Fig. 2, the line 18 connecting the receptacle to the circuit extends upwardly into the receptacle and terminates with an open end 22 adjacent the top or normally vapor region of the receptacle and is provided with a small opening 23 adjacent the bottom thereof for metering liquid refrigerant back into the system and for the return of oil to the system when such action is called for. By thus retarding the flow of liquid refrigerant to the system any tendency towards over-correction by such flow is avoided. Also, by having the end 22 of the tube 18 extend upwardly to a point near the top of the receptacle any non-condensing gases which may be present in the system will tend to collect in the receptacle and be purged from the circuit while at the same time the open end 22 permits unrestricted flow of refrigerant into the receptacle.

Alternate forms of the receptacle and manner in which the receptacle 17 can be connected to and heat exchanged with the conduit 10 are illustrated in Figs. 3 and 4 in which the same reference numerals are used to indicate the same elements.

In the modification shown in Fig. 3, the conduit 10 forms an inverted U-shaped loop 30 within receptacle 17 for heat exchange with the receptacle. An opening 23 in loop 30 near the bottom of the receptacle provides an oil return to the system while an opening 32 at the upper end of the loop near the top of the receptacle returns non-condensable gases to the system.

In the form shown in Fig. 4, the conduit extends upwardly through the receptacle from the bottom to the top thereof, holes 23 and 32 in conduit 10 performing the same functions as hereinbefore described. In both of these modifications, the discharge line 21 is heat exchanged with the receptacle 17 in the same manner as in the modification of Fig. 2.

From the foregoing it will be apparent that there has been provided in accordance with the present invention simple arrangement for controlling the operation of a heat pump including a fixed flow restricting means to obtain improved operation on both the heating and the cooling cycles. Although a specific arrangement has been illustrated and described, various modifications will be apparent to those skilled in the art and it is therefore intended by the appended claims to cover all modifications within the spirit and scope of the present invention.

What I claim as new and desire to secure by Letters Patent of the United States is:

1. A heat pump comprising an indoor heat exchanger and an outdoor heat exchanger connected in a closed refrigerant circuit; means in said circuit including a compressor having a discharge line and a suction line and reversing valve means for reversibly connecting said discharge and suction lines to said heat exchangers for effecting flow of refrigerant through said circuit in either direction whereby said pump may be operated on a cooling cycle with the outdoor coil functioning as a condenser and receiving high pressure refrigerant from said compressor or on a heating cycle with the indoor coil functioning as a condenser and receiving high pressure refrigerant from said compressor; flow restricting means in said circuit for controlling the flow of refrigerant from either of said heat exchangers to the other and for maintaining a pressure difference between said heat exchangers; said flow restricting means comprising a cooling capillary connected to said indoor heat exchanger and a heating capillary connected to said outdoor heat exchanger, a conduit connecting said capillaries in series, and means for bypassing one or the other of said capillaries whereby the pressure difference between said heat exchangers is provided by said cooling capillary during operation of said pump on the cooling cycle and by said heating capillary during operation of said pump on the heating cycle so that said conduit conducts high pressure refrigerant during either cycle of operation; and a charge modulator means for controlling the effective refrigerant charge circulating in said circuit, said modulator means comprising a refrigerant receptacle connected for two-way flow to said conduit; said receptacle being in heat exchange relation with a section of said conduit for withdrawing refrigerant from or discharging refrigerant into said circuit in response to the temperature of refrigerant flowing though said conduit and in heat exchange with a section of said discharge line for withdrawing refrigerant from or discharging refrigerant to said circuit in response to the temperature of the refrigerant discharged from said compressor.

2. The heat pump of claim 1 in which said conduit extends through said receptacle and includes upper and lower openings therein providing two-way flow between said conduit and said receptacle.

3. A heat pump comprising an indoor heat exchanger and an outdoor heat exchanger connected in a closed refrigerant circuit; means in said circuit including a compressor having a discharge line and a suction line and reversing valve means for reversibly connecting said discharge and suction lines to said heat exchangers for effecting flow of refrigerant through said circuit in either direction whereby said pump may be operated on a cooling cycle with the outdoor coil functioning as a condenser and receiving a high pressure refrigerant from said compressor or on a heating cycle with the indoor coil functioning as a condenser and receiving high pressure refrigerant from said compressor; flow restricting means in said circuit for controlling the flow of refrigerant from either of said heat exchangers to the other and for maintaining a pressure difference between said heat exchangers; said flow restricting means comprising a cooling capillary having one end connected to said indoor heat exchanger and a heating capillary having one end connected to said outdoor heat exchanger, a conduit connecting the other ends of said capillaries, and means for bypassing one or the other of said capillaries whereby the pressure difference between said heat exchangers is provided primarily by said cooling capillary during operation of said pump on the cooling cycle and by said heating capillary during operation of said pump on the heating cycle and said conduit contains high pressure refrigerant during either cycle of operation; and a charge modulator means for controlling the effective refrigerant charge circulating in said circuit comprising a dead-end refrigerant receptacle connected for two-way flow to said conduit; said receptacle being in heat exchange relation with said conduit for withdrawing refrigerant from said circuit upon excessive subcooling of the refrigerant in said conduit and with said discharge line for discharging refrigerant into said system upon an excessive increase in the temperature of the compressed refrigerant flowing through said discharge line.

4. A heat pump comprising an indoor heat exchanger and an outdoor heat exchanger connected in a closed refrigerant circuit; means in said circuit including a compressor having a discharge line and a suction line and reversing valve means for reversibly connecting said discharge and suction lines to said heat exchangers for effecting flow of refrigerant through said circuit in either direction whereby said pump may be operated on a cooling cycle with the outdoor coil functioning as a condenser and receiving high pressure refrigerant from said compressor or on a heating cycle with the indoor coil functioning as a condenser and receiving high pressure refrigerant from said compressor; flow restricting means in said circuit for controlling the flow of refrigerant from either of said heat exchangers to the other and for maintaining a pressure difference between said heat exchangers; said flow restricting means comprising a cooling capillary connected to said indoor heat exchanger and a heating capillary connected to said outdoor heat exchanger, a conduit connecting said capillaries in series, and means bypassing one or the other of said capillaries whereby the pressure difference between said heat exchangers is provided by said cooling capillary during operation of said pump on the cooling cycle and by said heating capillary during operation of said pump on the heating cycle and said conduit conducts high pressure refrigerant during either cycle of operation; and a charge modulator means for controlling the effective refrigerant charge circulating in said circuit comprising a dead-end refrigerant receptacle and a line connecting the bottom of said receptacle to said conduit; said receptacle having an upper portion thereof in heat exchange relation with a section of said conduit for withdrawing refrigerant from or discharging refrigerant into said circuit in response to the temperature of refrigerant flowing through said conduit and having a lower portion thereof in heat exchange with a section of said discharge line for withdrawing refrigerant from or discharging refrigerant to said circuit in response to the temperature of the refrigerant discharged from said compressor.

5. A heat pump comprising an indoor heat exchanger and an outdoor heat exchanger connected in a closed refrigerant circuit; means in said circuit including a compressor having a discharge line and a suction line and reversing valve means for reversibly connecting said discharge and suction lines to said heat exchangers for effecting flow of refrigerant through said circuit in either direction whereby said pump may be operated on a cooling cycle with the outdoor coil functioning as a condenser and receiving high pressure refrigerant from said compressor or on a heating cycle with the indoor coil functioning as a condenser and receiving high pressure refrigerant from said compressor; flow restricting means in said circuit for controlling the flow of refrigerant from either of said heat exchangers to the other and for maintaining a pressure difference between said heat exchangers; said flow restricting means comprising a cooling capillary connected to said indoor heat exchanger and a heating capillary connected to said outdoor heat exchanger, a conduit connecting said capillaries in series, and means for bypassing one or the other of said capillaries whereby the pressure difference between said heat exchangers is provided by said cooling capillary during operation of said pump on the cooling cycle and by said heating capillary during operation of said pump on the heating cycle whereby said conduit conducts high pressure refrigerant during either cycle of operation; and a charge modulator means for controlling the effective refrigerant charge circulating in said circuit, said modulator means comprising a dead-end refrigerant receptacle connected for two way flow to said conduit; said receptacle being in heat exchange relation with a section of said conduit and to a lesser extent with a portion of said discharge line.

References Cited in the file of this patent
UNITED STATES PATENTS

| | | |
|---|---|---|
| 2,589,384 | Hopkins | Mar. 18, 1952 |
| 2,885,868 | Radcliffe | May 12, 1959 |
| 2,934,323 | Burke | Apr. 26, 1960 |